March 11, 1924.

A. A. SANDBROOK

LAMP CASING

Filed July 20, 1923

1,486,357

Witnesses:
Betty McWhirter.

Inventor:
Alfred A. Sandbrook,
By Chatwin & Company
Attys

Patented Mar. 11, 1924.

1,486,357

UNITED STATES PATENT OFFICE.

ALFRED AUGUSTUS SANDBROOK, OF LONDON, ENGLAND.

LAMP CASING.

Application filed July 20, 1923. Serial No. 652,764.

*To all whom it may concern:*

Be it known that I, ALFRED AUGUSTUS SANDBROOK, a subject of the King of England, residing in the city of London, in the Kingdom of England, have invented new and useful Improvements in or Relating to Lamp Casings, of which the following is a specification.

My invention relates to electric lamps, more especially to those used for road vehicles and consists essentially in providing a lamp body of opaque resilient material such for example as rubber, gutta percha or other like composition so as to be capable of resisting damage upon impact.

According to my invention I replace the ordinary metal body by one of opaque rubber or other similar resilient composition. The glass or glasses is or are either provided with a metal or like beading formed with a channel to receive the edge round the hole in the body, such edge being thickened or beaded if desired or the resilient body is thickened where the glass is to be fitted and formed with a groove so that the glass may be forced in, as is done with certain types of rubber motor goggles.

In this manner the glass can be easily replaced or be made removable or form an air-tight joint as required.

The electric bulb-holder can be pushed up through a hole in the body and held tightly in place by a screwed nut, collar or the like on either side of the body, or by the beaded edge of the body similarly to the glasses.

One or more glasses may be fitted in similar manner according to the use of the lamp; mica or the like can naturally be used in lieu of glass.

In order that my invention may be clearly understood and readily carried into effect I will proceed to describe the same hereinafter with reference to the accompanying drawings which show a constructional embodiment of the lamp by way of example, and in which:—

Figure 1:
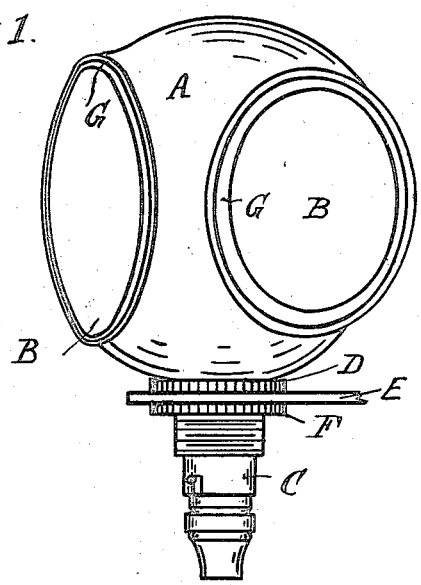
Figure 2:
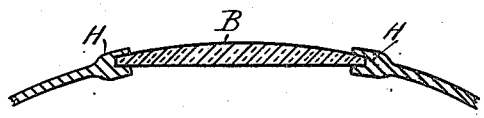
Figure 3:
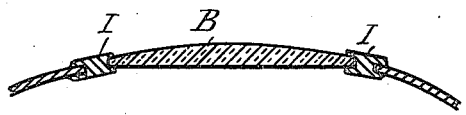

Figure 1 shows a front elevation of a complete lamp; Fig. 2 shows an enlarged view of a glass or the like held in the thickened edge of the body; Fig. 3 is a similar view to Fig. 2 but showing the application of a metal beading.

In these drawings, the body portion A of the lamp is made of a resilient material, an aperture being left for each glass required as well as for the insertion of the electric bulb and its fittings or holder. The edges round the said apertures may be formed in various manners say by thickening the rim and forming a grooved bead for the glass to rest in, as at H, or the glass may be provided with a metal or like fitting capable of being secured on to the edge of the resilient body at the apertures and being provided with a channel or rim as at I.

In Fig. 1 the lamp body A is shown with two glasses B and is suitable for a rear motor lamp. The bulb is carried in the holder C and secured in position by the milled ring D which presses the body against a similar ring or a collar, provided on the holder but disposed inside the body. The lamp is secured to a bracket E by another milled ring F or in any other appropriate manner.

The glasses B are in this case held in a metal fitting G which forms the necessary channel or groove to accommodate the glass. The glasses may be removable as in motor goggles.

The body being resilient will give upon impact with another body, dents will be avoided and the glass will not easily be broken. One of the rims may be fitted with a door especially for front- or head-lamps. The term "free" as used in claim 1 is intended to define a structure wherein the housing is not connected to or surrounded by any rigid element at such a point or in such manner as to interfere with the free collapsing of said housing under external blows.

I claim:

1. A vehicle lamp comprising a rigid transparent element and a free opaque housing made of a material stiff enough to stand up and maintain its form under normal conditions, flexible enough to be bent out of shape without breaking under external pressure and resilient enough to resume its original shape when such external pressure is removed, said housing being of such shape and amplitude as to completely enclose and house a source of light in such manner that the source of light lies wholly within the confines of said housing.

2. A vehicle lamp comprising in combination a rigid transparent lens and a body portion constituting a housing for a source of light and of such shape and amplitude as to completely enclose and house the said source of light and by which said lens is carried and supported, said body portion being formed wholly of a resilient and elastic material.

3. An electric lamp for vehicles comprising a resilient and opaque rubber body having a light opening formed in its wall and of such shape and amplitude as to completely enclose and house a source of light, a transparent element for closing said opening and stiffening means about the edge of the transparent element for holding said element securely in engagement with the rubber body portion.

4. An electric lamp for vehicles comprising a body formed wholly of resilient and opaque rubber having a light opening formed in its wall and of such shape and amplitude as to completely enclose and house the source of light for said lamp, a transparent element for covering said opening and a metallic rim grooved about its inner periphery for the reception of the said element and grooved about its outer periphery to receive the material of said rubber body.

ALFRED AUGUSTUS SANDBROOK.